(12) United States Patent
Nimura et al.

(10) Patent No.: US 8,474,566 B2
(45) Date of Patent: Jul. 2, 2013

(54) SHAFT DRIVE TYPE MOTORCYCLE

(75) Inventors: Taisuke Nimura, Saitama (JP);
Hidetoshi Toyoda, Saitama (JP);
Yusaku Yamashita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 688 days.

(21) Appl. No.: 12/567,379

(22) Filed: Sep. 25, 2009

(65) Prior Publication Data

US 2010/0078250 A1 Apr. 1, 2010

(30) Foreign Application Priority Data

Sep. 30, 2008 (JP) ................................. 2008-253571
Sep. 30, 2008 (JP) ................................. 2008-253673

(51) Int. Cl.
*B62D 61/02* (2006.01)
*B62K 11/00* (2006.01)

(52) U.S. Cl.
USPC ........................... 180/226; 180/227; 180/230

(58) Field of Classification Search
USPC .......................... 180/219, 226, 227, 228, 230
See application file for complete search history.

(56) References Cited

U.S. PATENT DOCUMENTS

2007/0095591 A1* 5/2007 Takayanagi et al. .......... 180/226

FOREIGN PATENT DOCUMENTS

| JP | 62-023786 U | 2/1987 |
| JP | H01-074990 U | 5/1989 |
| JP | H03-093265 U | 9/1991 |
| JP | 2001-165949 A | 6/2001 |
| JP | 2006-248296 A | 9/2006 |
| JP | 2008-87540 A | 4/2008 |

* cited by examiner

*Primary Examiner* — Kevin Hurley
*Assistant Examiner* — Marc A Scharich
(74) *Attorney, Agent, or Firm* — Birch, Stewart, Kolasch & Birch, LLP (57) ABSTRACT

A shaft drive type motorcycle includes a drive shaft for permitting a reduction in the vehicle weight. The shaft drive type motorcycle includes a gear box provided at a rear part of a swing arm with a bearing provided between the gear box and a rear wheel axle. The bearing includes an outer race and balls and an inner race operative provided to rotatably support the rear wheel axle. A presser flange is provided between the rear wheel axle and a rear wheel that includes a hollow cylindrical part pressing the inner race in the axial direction of the rear wheel axle. A flange part is provided as part of the presser flange to which a brake disc is mounted. A labyrinth structure is provided for making it difficult for oil from leaking out of the gear box.

20 Claims, 10 Drawing Sheets

FIG. 9(a)  EXAMPLE

FIG. 9(b)  COMPARATIVE EXAMPLE

SHAFT DRIVE TYPE MOTORCYCLE

CROSS-REFERENCE TO RELATED APPLICATIONS

The present application claims priority under 35 USC 119 to Japanese Patent Application No. 2008-253673 filed on Sep. 30, 2008 and Japanese Patent Application No. 2008-253571 filed on Sep. 30, 2008 the entire contents of which are hereby incorporated by reference.

BACKGROUND OF THE INVENTION

1. Field of the Invention

The present invention relates to a shaft drive type motorcycle having a drive shaft.

2. Description of Background Art

A shaft drive type motorcycle is known wherein a drive shaft is provided on the lower side of a pivot shaft, and a driving force of an engine is transmitted to a rear wheel by the drive shaft. See, for example, Japanese Patent Laid-open No. 2008-87540 (FIG. 3).

In FIG. 3 of Japanese Patent Laid-open No. 2008-87540, a swing arm 12 (the reference symbols used in the document are used as they are here) swingably supports a rear wheel 2 (the swing arm will hereinafter be referred to as "the swing arm 12") is provided on the left side in the vehicle with a gear box 44 being provided at a rear part of the swing arm 12. A drive shaft 45 for transmitting the motive power of an engine to the rear wheel 2 is provided on the inner side of the swing arm 12 with a drive axle 56 (hereinafter referred to as "the rear wheel axle 56") penetrating the inside of the gear box 44. The rear wheel 2 is mounted to the rear wheel axle 56.

In the technology described in Japanese Patent Laid-open No. 2008-87540, a brake disc 15 is laid on the rear wheel axle 56 with a hub 55 of the rear wheel 2 being laid on the brake disc 15. Nuts 58 . . . ( . . . means plurality, here and hereinafter) are fastened to bolts 57 . . . erectly provided on the rear wheel axle 56, from the outer side of the hub 55. In other words, the rear disc plate 15 is co-fastened to the rear wheel axle 56 together with the hub 55, by the bolts 57 . . . and the nuts 58 . . . .

The brake disc 15 configured as described above is formed to have a predetermined plate thickness as measured outwards from the fastening positions of the bolts and the nuts. In the brake disc 15, the inside part not sandwiched by a rear brake disc caliper does not exhibit the function intrinsic of the brake disc 15. Therefore, there is room for improvements from the viewpoint of reducing the vehicle weight.

Though not disclosed in Japanese Patent Laid-open No. 2008-87540, the inside of the gear box 44 is filled with lubricating oil, and an oil seal is provided between the gear box 44 and the rear wheel axle 56. Further, for making it difficult for the oil to leak, a labyrinth plate having a labyrinth structure or the like member is provided in addition to the oil seal, so as to contrive an enhancement of the oil sealing performance and for prevention of mud, water or the like from coming in from the outside.

In the above-mentioned structure, however, the labyrinth plate having a labyrinth structure or the like member is needed as a separate component part. Accordingly, the number of component parts is increased, which may lead to an increase in the vehicle cost.

SUMMARY AND OBJECTS OF THE INVENTION

It is an object of an embodiment of the present invention to provide, in relation to a shaft drive type motorcycle having a drive shaft, a technology by which it is possible to contrive a reduction in vehicle weight.

According to an embodiment of the invention, there is provided a shaft drive type motorcycle including a body frame, a swing arm provided on the body frame and operative to swingably support a rear wheel with a drive shaft provided in the swing arm or adjacently to the swing arm and by which a driving force of an engine is transmitted to a rear wheel axle provided in the rear wheel. A pinion gear is provided at one end of the drive shaft that is meshed with a final gear provided on the rear wheel axle with a gear box provided at a rear part of the swing arm and accommodating the final gear. A bearing is provided between the gear box and the rear wheel axle that includes an outer race and balls and an inner race that is operative to rotatably support the rear wheel axle. A presser flange having a hollow cylindrical part for pressing the inner race in the radial direction of the rear wheel axle is provided between the rear wheel axle and the rear wheel with the presser flange being provided with a flange part which is provided in the radial direction of the rear wheel axle and to which a brake disc is mounted.

According to an embodiment of the present invention, the flange part includes a plurality of arm parts extending in the radial direction of the rear wheel axle with the brake disc being mounted to tip parts of the arm parts.

According to an embodiment of the present invention, the swing arm is configured in a cantilever fashion in which the rear wheel is supported only from the gear box side, the brake disc is provided at its inside diameter part with a plurality of mounting seat parts which extend toward the radially inner side and which are mounted to the rear wheel side, and the mounting seat parts are mounted to the tip parts of the arm parts.

According to an embodiment of the present invention, a pulser ring for measurement of wheel speed is mounted on the radially inner side than disc mounting parts which are provided as part of the flange part and to which the brake disc is mounted. The pulser ring is provided with an outer riser wall part such that a gap between the presser flange and the outside diameter of the pulser ring is greater than the plate thickness of the brake disc.

According to an embodiment of the present invention, the presser flange is provided between the rear wheel axle and the rear wheel. In addition, the presser flange is provided with the flange part for mounting the brake disc. Where the flange part extends to the brake disc, it is unnecessary to extend the brake disc to the rear wheel axle. In addition, where it is unnecessary to extend the brake disc to the rear wheel axle, the brake disc can be reduced in weight.

In addition, with the presser flange replaced by a member which is less expensive than the brake disc, it is possible to reduce the vehicle cost.

Further, the presser flange includes the hollow cylindrical part for pressing the inner race in the axial direction of the rear wheel axle. On the outer side of the bearing, the rear wheel axle is enlarged in shaft diameter thereof due to the hollow cylindrical part of the presser flange, so that the rigidity of the rear wheel axle can be easily secured.

According to an embodiment of the present invention, the flange part includes the plurality of arm parts extending in the radial direction of the rear wheel axle, and the brake disc is mounted to tip parts of the arm parts. Therefore, it is possible to suppress the weight of the brake disc mounting parts, to reduce the amount of unnecessary material and, as a whole, to contrive a reduced vehicle weight.

According to an embodiment of the present invention, the swing arm is configured in a cantilever fashion in which the rear wheel is supported only from the gear box side, so that the rear wheel can easily be mounted and detached.

In addition, the brake disc is provided at its inside diameter part with the plurality of mounting seat parts extending toward the radially inner side, and the mounting seat parts are mounted to the tip parts of the arm parts. Therefore, at the times of mounting and detaching the brake disc, the mounting seat parts can be moved in the vehicle width direction from the rear wheel mounting side, in such a manner as not to interfere with the arm parts provided as part of the presser flange. Since the mounting seat parts are made to be movable in the vehicle width direction, it is possible to enhance the attachability/detachability of the brake disc, and to enhance the assembleability and maintainability.

According to an embodiment of the present invention, the pulser ring is mounted on the radially inner side than the disc mounting parts provided as part of the flange part. The presser flange eliminates the need for an inside portion of the brake disc, so that the pulser ring can be mounted in position by utilizing the inside portion area of the brake disc. Accordingly, the structure around the brake disc can be configured to be compact and thin.

In addition, with the gap between the presser flange and the outside diameter part of the pulser ring set to be greater than the plate thickness of the brake disc, the disc mounting parts can be turned between the presser flange and the outside diameter part of the pulser ring, whereby both a compact structure around the brake disc and good attachability/detachability of the brake disc can be realized.

It is an object of an embodiment of the present invention to provide, in relation to a shaft drive type motorcycle having a labyrinth structure for making it difficult for oil from leaking out of a gear box, a technology for reducing the cost of the vehicle.

According to an embodiment of the present invention, there is provided a shaft drive type motorcycle including a body frame, a swing arm provided on the body frame and operative to swingably support a rear wheel, a drive shaft which is provided in the swing arm or adjacently to the swing arm and by which a driving force of an engine is transmitted to a rear wheel axle provided in the rear wheel, a pinion gear provided at one end of the drive shaft and meshed with a final gear provided on the rear wheel axle, and a gear box provided at a rear part of the swing arm and accommodating the final gear. The gear box is provided with an opening part through which to pass the rear wheel axle, the rear wheel axle is equipped with a pulser ring for measurement of wheel speed of the rear wheel. A labyrinth wall part is provided that extends to the inner side of the opening part in the vehicle width direction. The labyrinth wall part is integrally provided on the radially inner side of the pulser ring.

According to an embodiment of the present invention, an inside wall extending toward the center of the rear wheel axle is provided at an end part on the rear wheel side of the opening part.

According to an embodiment of the present invention, a bearing is provided between the rear wheel axle and the opening part. A presser flange, having a hollow cylindrical part for pressing an inner race of the bearing, is provided between the rear wheel axle and the rear wheel. A brake disc is mounted to the presser flange part with the pulser ring being mounted on the inner side of the brake disc.

According to an embodiment of the present invention, the rear wheel axle is equipped with the pulser ring for measurement of the wheel speed of the rear wheel. In addition, the labyrinth wall part extending in the vehicle width direction is integrally provided on the radially inner side of the pulser ring.

The inside of the gear box is filled with lubricating oil, an oil seal is provided between the gear box and the rear wheel axle, and a labyrinth member having a labyrinth structure or the like member is provided on the outer side of the oil seal so as to enhance the sealing effect.

Conventionally, for forming a labyrinth structure, it has been necessary to provide a labyrinth member as a separate member. This results in an increase in the number of component parts, which may lead to a rise in the cost of the vehicle.

According to an embodiment of the present invention, the pulser ring is integrally provided with the labyrinth wall part, so that an increase in the number of component parts is suppressed. By suppressing an increase in the number of component parts, the cost of the vehicle can be reduced.

According to an embodiment of the present invention, the inside wall extending toward the center of the rear wheel axle is provided at the end part on the rear wheel side of the opening part, so that a labyrinth can further be provided at an end part on the rear wheel side of the gear box. Therefore, leakage of the oil via the gap between the gear box and the rear wheel axle can be restrained more securely.

According to an embodiment of the present invention, the presser flange is provided between the rear wheel axle and the rear wheel, and the brake disc is mounted to the presser flange, so that the brake disc can be disposed in a limited space.

In addition, the pulser ring is mounted on the inner side of the brake disc. Therefore, when the brake disc and the pulser ring can be disposed so as to partly overlap with each other, a space saving in the vehicle width direction can be contrived at or around the rear wheel axle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A best mode for carrying out the present invention will be described below, based on the attached drawings. In the drawings, the expressions "up (upper)," "down (lower)," "left (leftward)," "right (rightward)," "front (forward)," and "rear (rearward)" refer to the directions as viewed from a rider seated on the vehicle.

Figure 1:
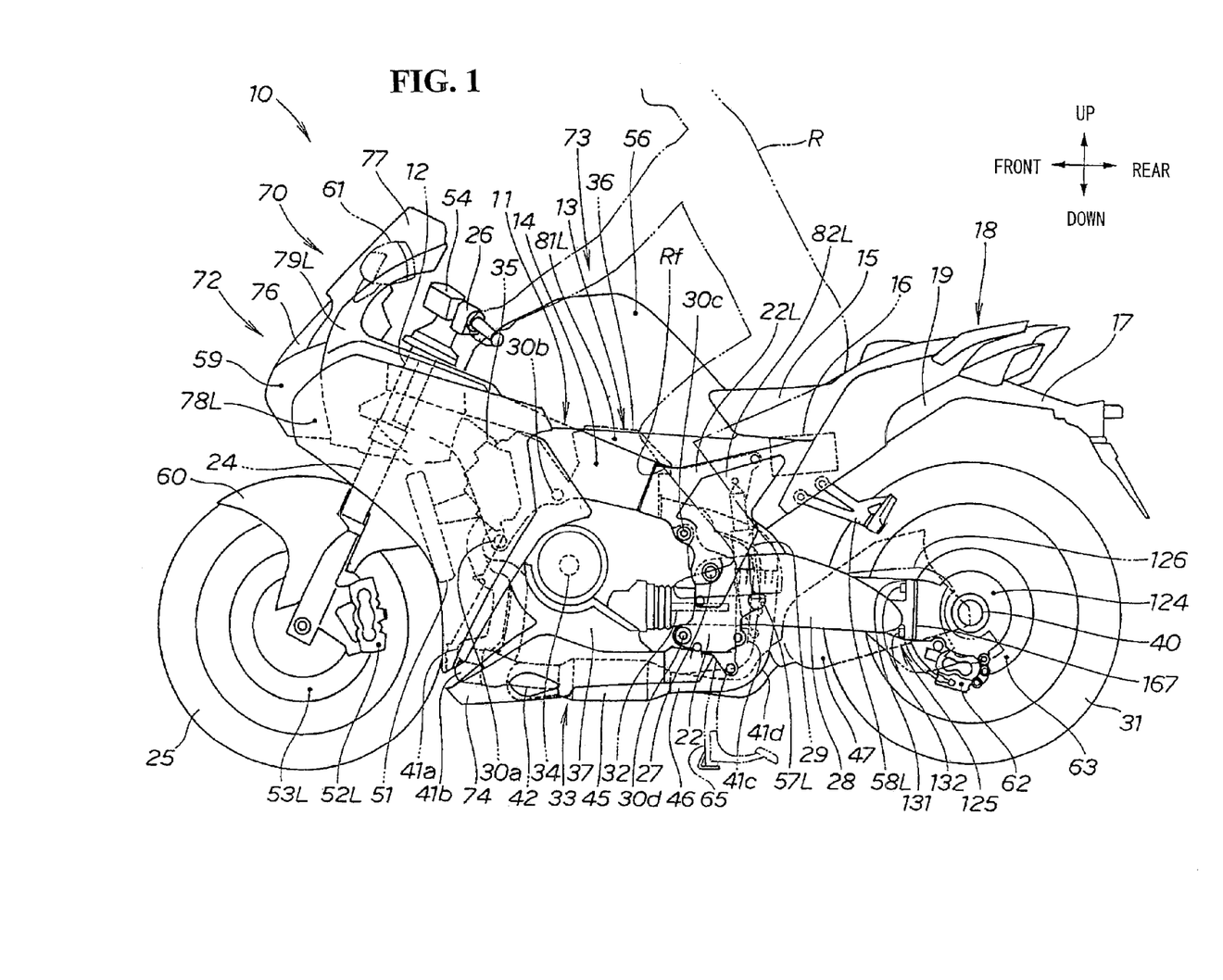
FIG. 1 is a left side view of a vehicle according to the present invention.

FIG. 1 is a left side view of a vehicle according to the present invention, illustrating a motorcycle 10 as the vehicle with a body frame 11.

The body frame 11 includes a head pipe 12, a main frame 14 extending rearwardly from the head pipe 12 for supporting an engine 13. A rear frame 19 extends rearwardly from an upper part of the rear end of the main frame 14 for supporting a rider's seat 15, is fitted with electric equipments such as a battery 16, and supports a body rear part 18 inclusive of a rear fender 17.

In addition, the main frame 14 includes pivot plates 22 for supporting a swing arm 28 provided at a rear end part of the main frame 14.

The pivot plates 22 are fitted with a pivot shaft 27 with the rear swing arm 28 (swing arm 28) is extending rearwardly from the pivot shaft 27. A rear shock absorber unit 29 for absorbing shocks is provided between the swing arm 28 and the main frame 14 with a rear wheel 31 being mounted to a tip part of the swing arm 28. The rear wheel 31 is driven by a drive shaft 32 for connecting the engine 13 and the rear wheel 31 to each other and transmits a driving force of the engine 13 to the rear wheel 31.

The head pipe 12 is fitted with a front fork 24 with a front wheel 25 being mounted to lower end parts of the front fork 24. A steering handle 26 for steering the front wheel 25 is provided at an upper end part of the front fork 24.

The engine 13 (V-type 4-cylinder engine 13) is mounted on the main frame 14. The engine 13 is supported on the main frame 14 through first to fourth support points 30a to 30d. The first to fourth support points 30a to 30d are provided horizontally along the vehicle width direction, and are arranged in this order from the front side toward the rear side of the vehicle. Of these support points, the third and fourth support points 30c and 30d are provided at the pivot plates 22. More specifically, the engine 13 is suspended by the main frame 14 and the pivot plates 22.

The V-type 4-cylinder engine 13 includes a crank case 37 with front cylinders 35 extending skewly toward the front upper side with a crankshaft 34 provided in the crankcase 37 as a center, and rear cylinders 36 extending skewly toward the rear upper side with the crankshaft 34 as a center are arranged in a V-shaped overall form. The V-type 4-cylinder engine 13 is so suspended that, when the vehicle is viewed sideways, the main frame 14 overlaps with the front cylinders 35 and the rear cylinders 36 constituting upper parts of the engine 13, and some parts of the pivot plates 22 overlap with the crankcase 37 constituting a rear part of the engine 13.

The V-type 4-cylinder engine 13 is provided with an exhaust system 33.

The exhaust system 33 includes exhaust pipes 41a to 41d extending respectively from the cylinders 35, 35, 36, 36, a catalyst pipe 45 into which the exhaust pipes 41a to 41d are collected and which clarifies an exhaust gas, a general collecting pipe 46 extending from the catalyst pipe 45, and a muffler 47 connected to the general collecting pipe 46.

A radiator unit 51 is provided for cooling the engine 13. Front disc brake calipers 52L and 52R are provided on the front fork (only symbol 52L on the viewer's side is shown, and the same applies hereinafter). Front brake discs 53L and 53R are provided at the front wheel 25 and are sandwiched between the front disc brake calipers 52L and 52R (only symbol 53L on the viewer's side is shown, and the same applies hereinafter). A front master cylinder 54 is provided at the steering handle. A fuel tank cover 56 for covering a fuel tank is attached to the main frame 14 and functions also as a cowl part 70 (described later). Rider's steps 57L and 57R are attached to the main frame 14 (only symbol 57L on the viewer's side is shown, and the same applies hereinafter). Pillion passenger's steps 58L and 58R are attached to the rear frame 19 (only symbol 58L on the viewer's side is shown, and the same applies hereinafter). A headlight 59 is provided adjacent to a front fender 60. Mirrors 61L and 61R are provided (only symbol 61L on the viewer's side is shown, and the same applies hereinafter). A rear disc brake caliper 62 are provided together with a rear brake disc 63 which is provided on the rear wheel 31 and is sandwiched by the rear disc brake caliper 62. A main stand 65 is mounted on the main frame.

The cowl part 70 constituting mainly an appearance part of the motorcycle 10 will be described below.

The cowl part 70 includes a front cowl part 72 extending from the head pipe 12 for covering the front side of the body frame 11 through a cowl stay 71 (described later). A side cowl part 73 is provided to be continuous with the front cowl part 72 for covering the lateral sides of the vehicle. An under cowl 74 is provided on the lower side of the engine 13. The cowl part 70 is provided which serves as a windshield and enhances the appearance of the vehicle.

The front cowl part 72 includes an upper center cowl 76 covering the upper side of the headlight 59, a windscreen 77 extending on the upper side of the upper center cowl 76, and some parts of front upper side cowls 79L and 79R (only symbol 79L on the viewer's side is shown, and the same applies hereinafter) to which middle cowls 78L and 78R (only symbol 78L on the viewer's side is shown, and the same applies hereinafter) covering the lateral sides of the main frame 14 are attached and which support left and right portions of the windscreen 77.

The side cowl part 73 includes the front upper side cowls 79L and 79R supporting the left and right parts of the windscreen 77; the middle cowls 78L and 78R covering the lateral sides of the head pipe 12 and the main frame 14; knee covers 81L and 81R (only symbol 81L on the viewer's side is shown, and the same applies hereinafter) which cover the lower side of the fuel tank cover 56 and are clamped between leg parts Rf of the rider R during riding; and pivot plate covers 82L and 82R which are provided on the lower side of the knee covers 81L, 81R and which cover the outside surfaces of the pivot plates 22L, 22R (only symbol 22L on the viewer's side is shown, and the same applies hereinafter) serving as components of the main frame 14.

Supplementing the rear part structure of the vehicle, at a rear part of the swing arm 28, a gear box 124 having a rear wheel axle 40 therein is provided, a fastening part 125 for fastening the gear box 124 to the swing arm 28 is provided, and the fastening part 125 is provided with a gear box cover 126 covering the outside surfaces of the gear box 124 from the lateral sides.

The fastening part 125 is provided with a flange part 131 provided on the swing arm 28 side, and fastening members 132..., which are attached to the flange part 131, are screwed into the gear box 124 from the swing arm 28 and fix the swing arm 28 and the gear box 124 relative to each other.

Figure 2:
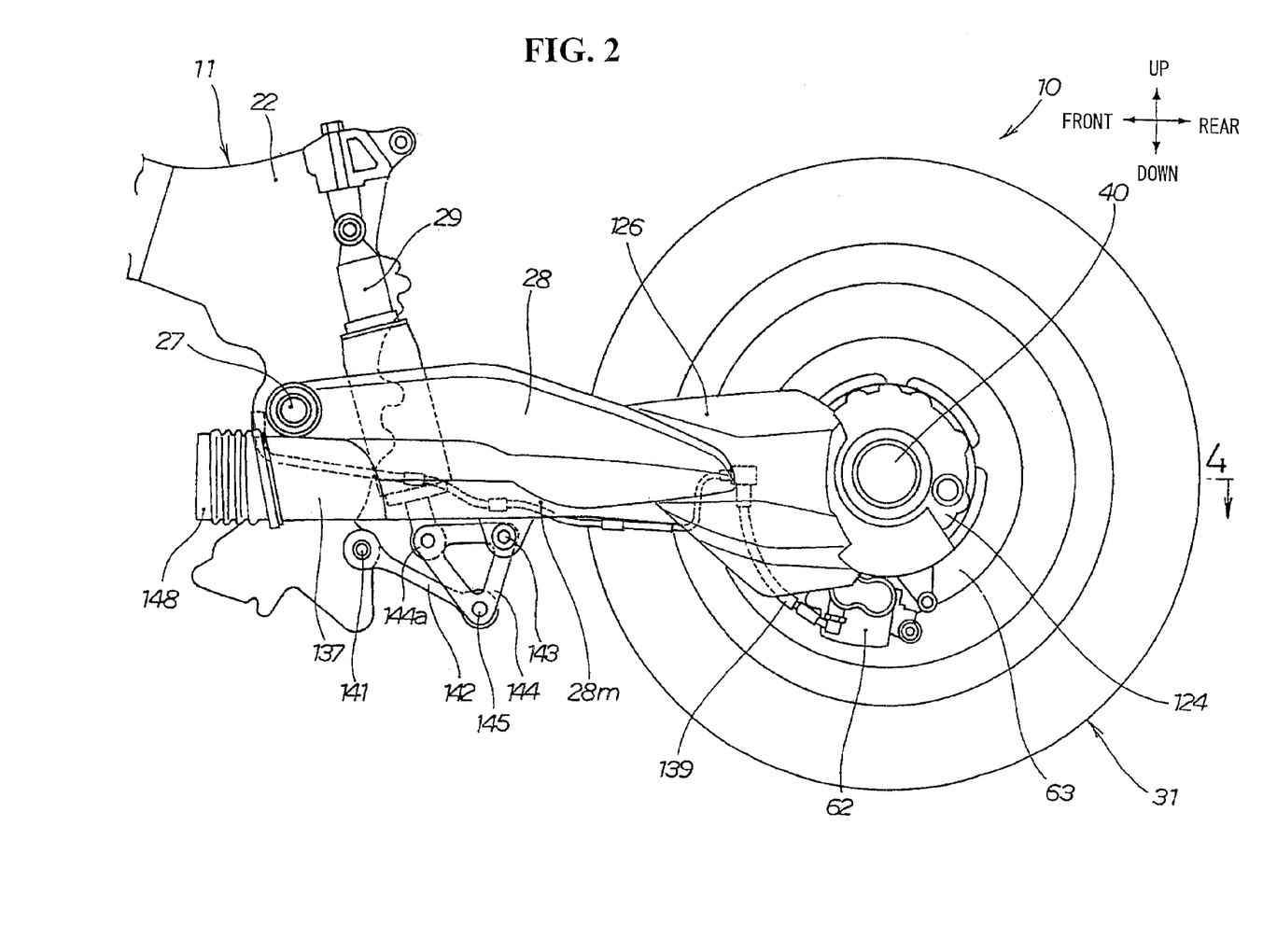
FIG. 2 is a side view of a major part of a motorcycle according to the present invention.
Figure 3:
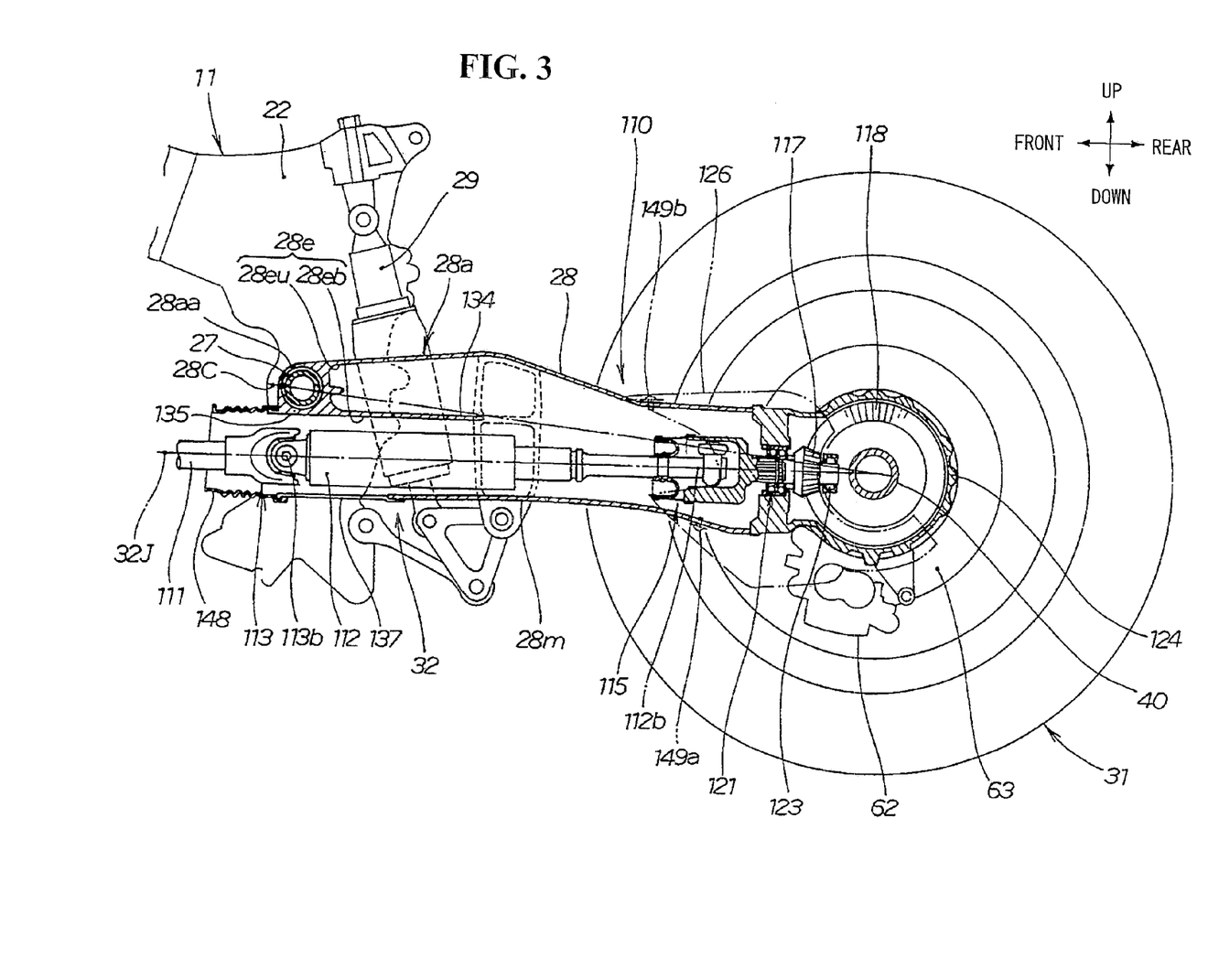
FIG. 3 is a sectional view of a major part of the motorcycle according to the present invention.

As illustrated in FIGS. 2 and 3, the motorcycle 10 according to the present invention can also be said to be a shaft drive type motorcycle 10, since the drive shaft 32 is used as means for transmitting the driving force of the engine (symbol 13 in FIG. 1) to the rear wheel 31.

The shaft drive type motorcycle 10 includes a pivot shaft 27 provided on the pivot plates 22, the swing arm 28 swingably provided on the pivot shaft 27, the rear wheel 31 rotatably borne on a rear part of the swing arm 28 through the rear wheel axle 40, and the rear shock absorber 29 interposed between the swing arm 28 and the body frame 11. The drive shaft 32 for transmitting the driving force of the engine 13 to the rear wheel 31 is provided inside the swing arm 28.

In addition, while the drive shaft is provided inside the swing arm in this embodiment, the drive shaft may be provided adjacently to the swing arm.

The drive shaft 32 includes a universal joint 113 connected to an output shaft 111 of the engine (symbol 13 in FIG. 1) and operative to transmit the driving force, a drive shaft 112 connected to the rear end 113b of the universal joint 113 and operative to transmit the driving force of the engine 13, a constant-velocity universal joint 115 attached to the rear end 112b of the drive shaft 112 for enabling the axial length of the drive shaft 112 to be varied, and a pinion gear 117 connected to the constant-velocity universal joint 115.

With the pinion gear 117 and a final gear 118 meshed with the pinion gear 117, the driving force of the engine 13 is transmitted to the rear wheel axle 40. Bearing parts 121 and 123 are provided for supporting the pinion gear 117. The structure for mounting the pinion gear 117 will be described in detail later.

Now, the configuration of the swing arm, the positional relationship between the swing arm and the drive shaft, etc. will be described below.

When the vehicle body is viewed sideways, the center axis 32J of the drive shaft is disposed on the lower side of a straight line 28C connecting the pivot shaft 27 and an axle shaft 40 (rear wheel axle 40) of the rear wheel 31 to each other. The straight line 28C connecting the pivot shaft 27 and the axle axis 40 of the rear wheel 31 to each other penetrates the swing arm 28 in the front-rear direction, and the swing arm 28 is provided to surround the drive shaft 32.

The swing arm 28 has a hollow part 28e, is provided in its front part 28a with an upper space 28eu and a lower space 28eb partitioned from each other by a partition member 134, and the drive shaft 32 is provided in the lower space 28eb.

Since the swing arm 28 is provided with the partition member 134 in its front part 28a, the rigidity in the vicinity of the pivot shaft 27 can be enhanced. In addition, the center of return of the swing arm 28 can be set close to the pivot shaft 27 in the height direction. If the center of return of the swing arm 28 can be set close to the pivot shaft 27, the behavior characteristics of the rear wheel 31 during cornering can be set close to those of a general motorcycle, so that appropriate steerability can be maintained during cornering.

The swing arm 28 is provided with a cutout part 133 at a lower part of the front end 28aa thereof. The cutout part 133 is covered with a cover member 137, and the cover member 137 covers a front part of the drive shaft 32. The cover member 137 is formed from a resin for providing a reduction in weight.

The gear box 124 for containing the rear wheel axle 40 and drive system component parts in the surroundings of the rear wheel axle 40 is disposed at a rear end part of the swing arm 28.

The swing arm 28 is provided with a first arm member 142 which extends rearwardly from the body frame 11 through a first swinging shaft 141 and is provided so as to be swingable, a second arm member 144 having a substantially triangular shape in side view which extends forwardly from an intermediate part 28m of the swing arm 28 through a second swinging shaft 143 and is provided so as to be swingable, the rear shock absorber unit 29 which is interposed between the front end 144a of the second arm member 144 and the body frame 11, and a third swinging shaft 145 by which a tip part of the first arm member 142 is swingably mounted to an intermediate part 144 of the second arm member 144. This ensures that vibrations exerted on the swing arm 28 and the like are absorbed. A boot 148 is provided together with bolts 149a and 149b for attaching the gear box cover 126 to the swing arm 28.

The swing arm 28 has a lower part of its front end 28aa cut out so that rigidity of the swing arm 28 on the lower side of the pivot shaft 27 is lowered. With the lowering of the rigidity of the swing arm 28 on the lower side of the pivot shaft 27, the center of return of the swing arm 28 can be set closer to the pivot shaft 27 in the height direction, whereby appropriate return characteristics can be set.

A brake hose 139 connected to the rear brake caliper 62 is covered by the gear box cover 126.

Since the brake hose 139 is covered by the gear box cover 126 so that the brake hose 139 is invisible the appearance around the rear brake caliper 62 can be further enhanced.

Figure 4:
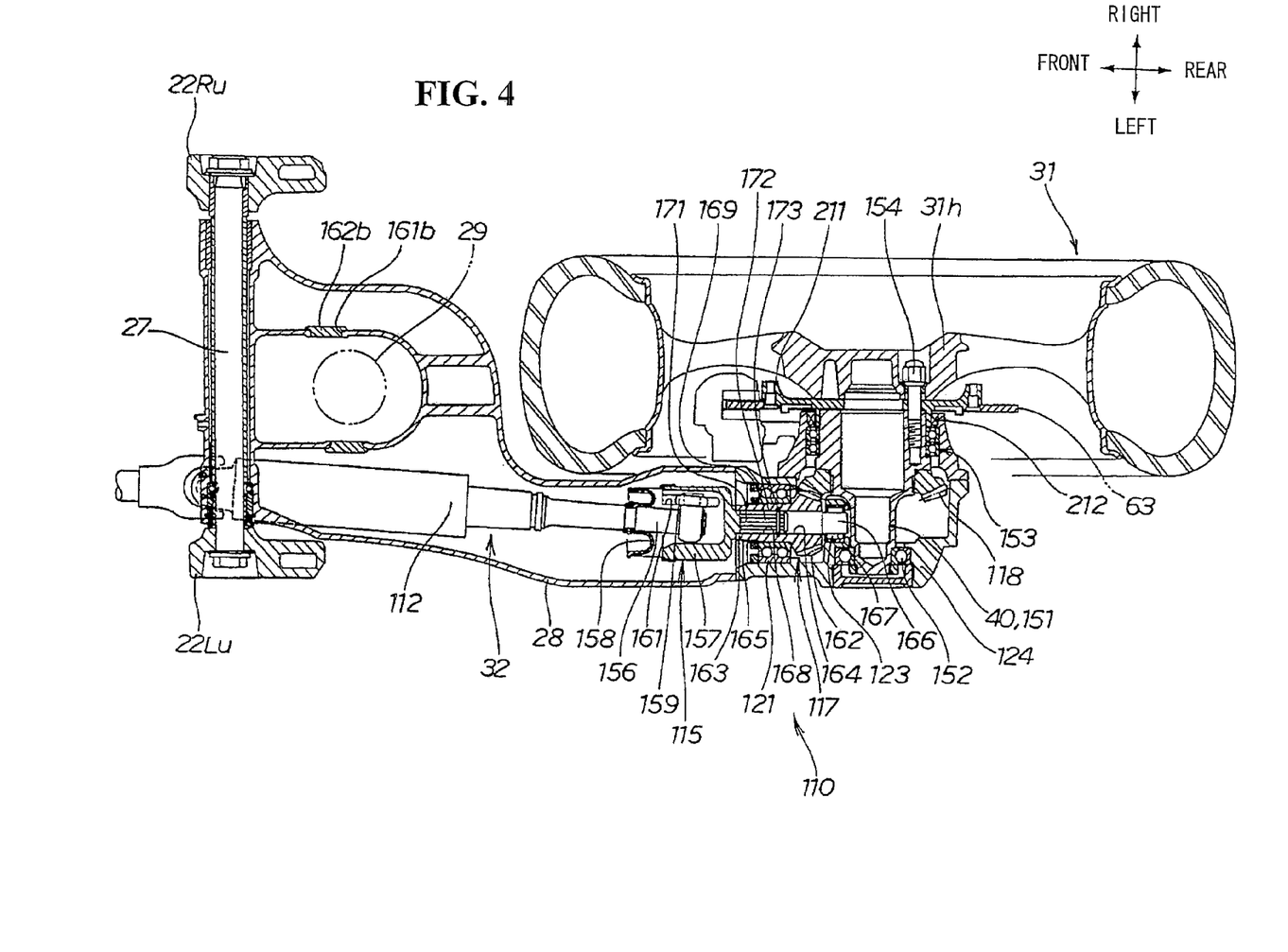
FIG. 4 is a sectional view taken along line 4-4 of FIG. 2.

FIG. 4 is a sectional view taken along line 4-4 of FIG. 2, showing that a rear wheel driving mechanism 110 includes, as main component elements thereof the drive shaft 32, the bearing parts 121 and 123 for rotatably supporting the pinion gear 117 constitutes a rear part of the drive shaft 32; the final gear 118 which is meshed with the pinion gear 117 serves as a component element of the drive shaft 32 and for changing the direction of the driving force of the engine 13 by 90°. A sleeve 151 as the rear wheel axle 40 to which the final gear 118 is integrally attached is provided together with a left bearing 152 and a right bearing 153 for rotatably supporting the sleeve 151. The gear box 124 supports both the left bearing 152 and the right bearing 153.

More specifically, the rear wheel driving mechanism 110 is contained in the swing arm 28 with the gear box 124 provided at the tip of the swing arm 28. The left and right bearings 152 and 153 are members which are provided between the gear box 124 and the rear wheel axle 40 for rotatably supporting the rear wheel axle 40.

The swing arm 28 is a member extending on the left side of the rear wheel 31, and the rear wheel 31 is supported in a cantilever fashion.

While the swing arm 28 and the drive shaft 32 are disposed on the left side of the rear wheel 31 in this embodiment, they may be disposed on the right side of the rear wheel 31.

To the sleeve 151 serving as the rear wheel axle 40 which is rotatably provided in the gear box 124, a rear brake disc 63 and a rear wheel hub 31h included in the rear wheel 31 are integrally fastened through fastening bolts 154.

The configuration as described above ensures that the driving force exerted on the final gear 118 serving as a driven gear is transmitted through the sleeve 151 and the rear wheel hub 31h to drive the rear wheel 31.

Now, details of the constant-velocity universal joint 115 and the pinion gear 117 connected to the constant-velocity universal joint 115 will be described below.

Figure 5:
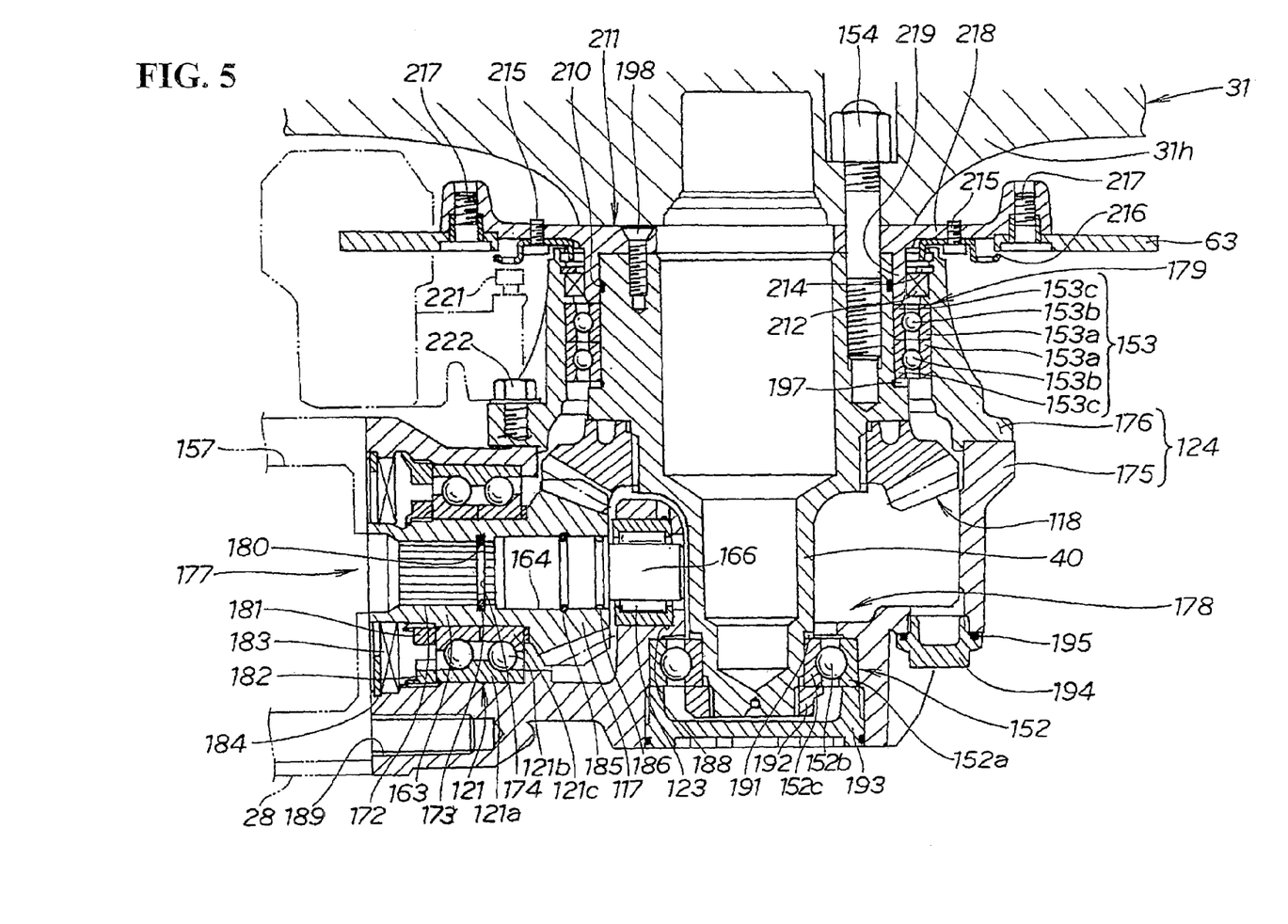
FIG. 5 is a sectional view for illustrating the internal structure of a gear box according to the present invention.

FIG. 5 is a sectional view for illustrating the internal structure of the gear box according to the present invention with a description being made by referring to FIG. 5 together with FIG. 4.

The constant-velocity universal joint 115 has an input shaft 156 as a tripod part which has three sub-shafts on the same plane and to which the driving force of the engine 13 is inputted, a cup 157 which is connected to the input shaft 156 so as to be inclinable and slidable and from which the driving force of the engine (symbol 13 in FIG. 1) is outputted, and a boot 158 covering a front part of the cup 157. A roller part 159 is fitted to the sub-shafts with a groove 161 in which the roller part is fitted.

The front part of the cup 157 is covered by the boot 158, and the inside of the cup 157 is filled with oil.

The pinion gear 117 includes a tooth part 162, and a tubular part 163 extending forwards from the tooth part 162. The tubular part 163 is provided with an inner peripheral part 164 as a through-hole, the inner peripheral part 164 is provided with female splines 168 at least at a front half thereof, and a pinion shaft 166 for supporting the rear end of the drive shaft 32 is inserted in a rear half of the inner peripheral part 164.

In this embodiment, the inner peripheral part 164 is provided with the female splines 168 over the entire surface of the inner peripheral part 164, for the convenience of machining, the pinion shaft 166 is inserted in the rear half of the inner peripheral surface 164 shaped in such a form, and the pinion shaft 166 is axially non-movably attached to the pinion gear 117 through a circlip 185.

Such a configuration ensures that the pinion gear 117 can be easily provided with the female splines 168 and the pinion shaft 166, whereby a rise in the cost of the pinion gear 117 is suppressed.

In addition, an outer peripheral part 165 of the tubular part 163 is supported by the bearing part 121, and an outer peripheral part 167 of the pinion shaft 166 is supported by the bearing part 123.

Male splines 169, provided on the constant-velocity universal joint 115, are provided with a first groove 174 in the circumferential direction, a circlip 173 is fitted in the first groove 174, and a tubular part of the pinion gear 117 is provided at its inner periphery with a second groove 180 for engagement with the circlip 173.

With the circlip 173 interposed in a spline coupling part 172, a shaft part 171 can be securely attached to the tubular part 163 at the spline coupling part 172, and, in addition, generation of axial vibrations or the like can be prevented from occurring.

The shaft part 171 extends rearwardly from the cup 157 of the constant-velocity universal joint, the shaft part 171 is provided with the male splines 169, the tubular part 163 extending forwardly from the pinion gear 117 is provided with the female splines 168 in which to fit the male splines 169, and the male splines 169 and the female splines 168 are coupled with each other. In short, the male splines 169 and the female splines 168 constitute the spline coupling part 172.

The spline coupling part 172 is disposed on the inside of the bearing part 121 for supporting the tubular part 163 serving as a pinion gear shaft as a shaft provided as part of the pinion gear 117. More specifically, the spline coupling part 172 is disposed so that a part thereof overlaps with the bearing part 121, and, therefore, the constant-velocity universal joint 115 can be disposed close to the bearing part 121. Since the constant-velocity universal joint 115 is disposed close to the bearing part 121, the generation of vibrations in the constant-velocity universal joint 115 can be further suppressed.

In addition, while the spline coupling part is disposed on the inside of the bearing part in this embodiment, the spline coupling part may be disposed on the outside of the bearing part.

The gear box 124 includes a gear case 175 which is provided with a left bearing 152 for supporting the left end of the rear wheel axle 40 and the bearing parts 121 and 123 for supporting the pinion gear 117. The gear case 175 covers the left side of the vehicle. A gear case cover 176 is disposed opposite to the gear case 175 and is provided with a right bearing 153 supporting the right end of the rear wheel axle 40.

The gear box 124 as described above is provided with a gear box front part 177 in which to contain the pinion gear 117, a gear box left part 178 in which to contain the left bearing 152 supporting the left side of the rear wheel axle 40, and a gear box right part 179 in which to contain the right bearing 153 supporting the right side of the rear wheel axle 40.

The gear box front part 177 includes the pinion gear 117; the bearing part 121 rotatably supporting the outer periphery of the tubular part 163 provided as part of the pinion gear 117; a first lock nut 181 for locking the inner race 121c of the bearing part 121 together with the tubular part 163; a second lock nut 182 for locking the outer race 121a of the bearing part 121 to the gear case 175 serving as a component member of the gear box 124; a first oil seal 183 provided on the front side of the first and second lock nuts 181 and 182; a first retainer clip 184 provided on the front side of the first oil seal 183; a pinion shaft 166 inserted in the tubular part 163 of the pinion gear 117 and operative to support a rear part of the pinion gear 117; a circlip 185 and an O-ring 186 interposed between the pinion shaft 166 and the tubular part 163; the bearing part 123 as a needle bearing for rotatably supporting a rear end part of the pinion shaft 166; and a stopper ring 188 provided on the outside of the bearing part 123.

A fastening hole 189 is provided into which the fastening member 132 is screwed.

The gear box left part 178 includes the left bearing 152 for rotatably supporting the left end of the rear wheel axle 40; a second shim ring 191 interposed between an inner race 152c of the left bearing 152 and the rear wheel axle 40; a third lock nut 192 for locking the inner race 152c of the left bearing 152 to the rear wheel axle 40; a fourth lock nut 193 as a retainer for locking an outer race 152a of the left bearing 152 to the gear box 124; a cap 194 closing a hole provided for measurement of backlash of the final gear 118; and a cap O-ring 195 as a seal member interposed between the cap 194 and the gear box 124.

The left bearing 152 includes the outer race 152a, balls 152b, and the inner race 152c.

The gear box right part 179 includes the right bearing 153 for rotatably supporting the rear wheel axle 40 integrated with the final gear 118; a third shim ring 197 for position adjustment which is interposed between an inner race 153c of the right bearing 153 and the rear wheel axle 40; a presser flange 211 for pressing the inner race 153c of the right bearing 153 from the outer side toward the inner side of the vehicle in the axial direction of the rear wheel axle 40 through screw members 198 . . . ; an axle oil seal 212 interposed between the presser flange 211 and the gear box 124; a retainer ring 214 for preventing the axle oil seal 212 from slipping off; a pulser ring 216 is provided at the presser flange 211 through bolts 215 . . . which serves to measure the wheel speed of the rear wheel 31; and the rear brake disc 63 is provided at the presser flange 211 through flat bolts 217 . . . ( . . . means a plurality, and the same applies hereinafter).

The presser flange 211 is so mounted that a hollow cylindrical part 219 is disposed between the axle oil seal 212 and the retainer ring 214, and the rear wheel axle 40.

The right bearing 153 has a structure in which radial-type bearings each includes the outer race 153a, balls 153b and an inner race 153c are arranged in two rows.

The presser flange 211 includes a flange part 218 which is provided in the radial direction of the rear wheel axle 40 and to which the rear brake disc 63 is attached; and the hollow cylindrical part 219 which is disposed between the rear wheel axle 40 and the rear wheel hub 31h and which presses the inner race 153c in the axial direction of the rear wheel axle 40.

A sensor 221 is provided on the swing arm 28 side and is combined with the pulser ring 216 for detecting a wheel speed signal. A bolt 222 is provided for attaching the gear case cover 176 to the gear case 175.

Figure 6:
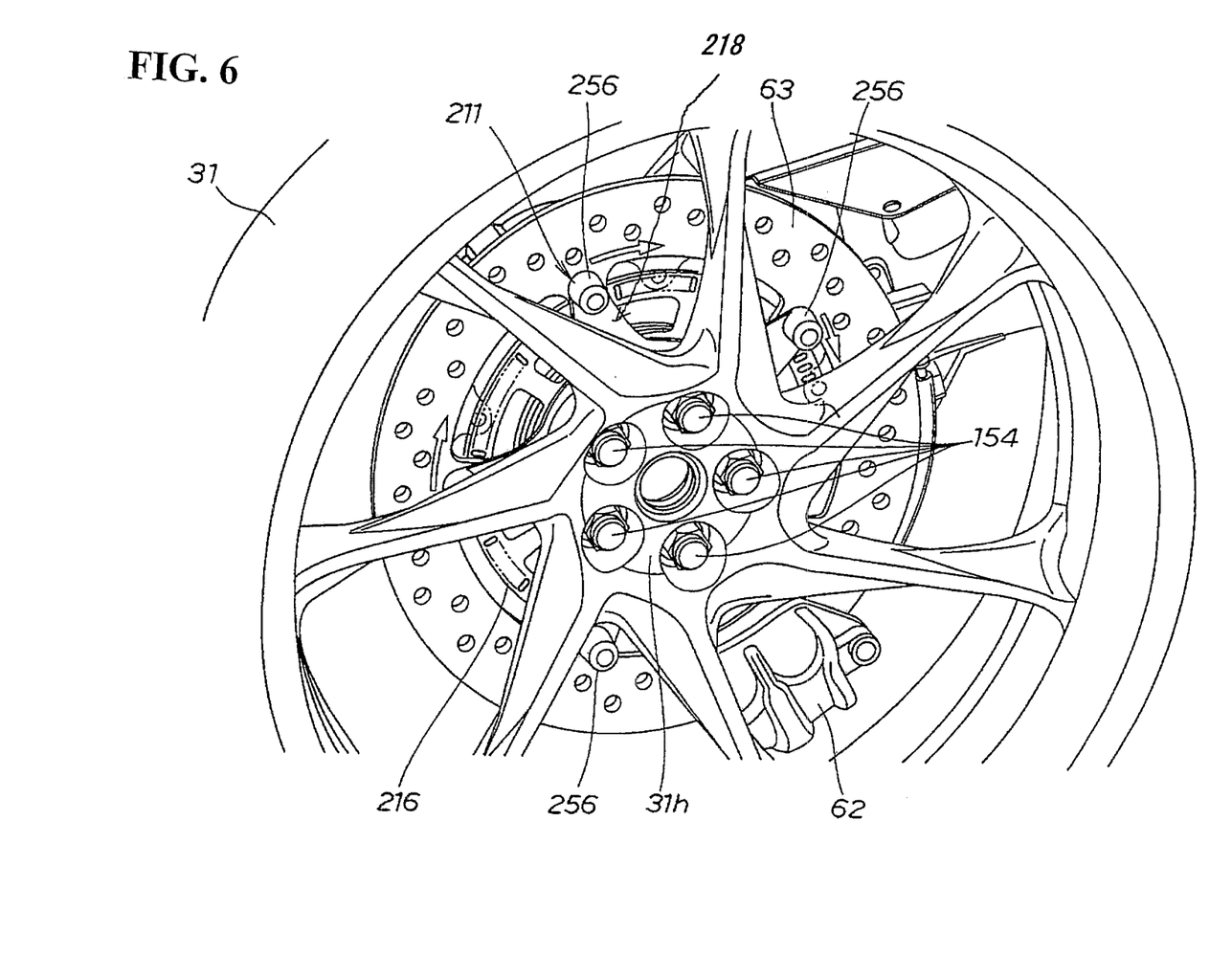
FIG. 6 is a perspective view showing a presser flange attached to a rear wheel according to the present invention and the surroundings of the same.

FIG. 6 is a perspective view for illustrating the presser flange attached to the rear wheel according to the present invention and the surroundings of the presser flange.

The rear wheel hub 31h is attached to the rear wheel axle (symbol 40 in FIG. 5) through the fastening bolts 154 . . . , with the presser flange 211 rotating as one body with the rear wheel hub 31h. The presser flange 211 is provided with a flange part 218. The flange part 218 includes five arm parts 256 . . . extending in the radial direction of the rear wheel axle 40 with the rear brake disc 63 being attached to tip parts of the arm parts 256 . . . .

As illustrated in FIG. 5, the presser flange 211 is provided between the rear wheel axle 40 and the rear wheel 31, and the rear brake disc 63 is attached to the presser flange 211, so that the rear brake disc 63 can be disposed in a limited space. In addition, the pulser ring 216 is mounted on the inner side of the rear brake disc 63. More specifically, the pulser ring 216 is mounted on the inner side in the radial direction relative to disc mounting parts 247 . . . provided as part of the flange part 218. The presser flange 211 eliminates the need for an inner-side portion of the rear brake disc 63, so that the pulser ring 216 can be mounted by utilizing the inner-side area of the rear brake disc 63, and the structure around the rear brake disc can be configured to be compact and thin.

Figure 7:
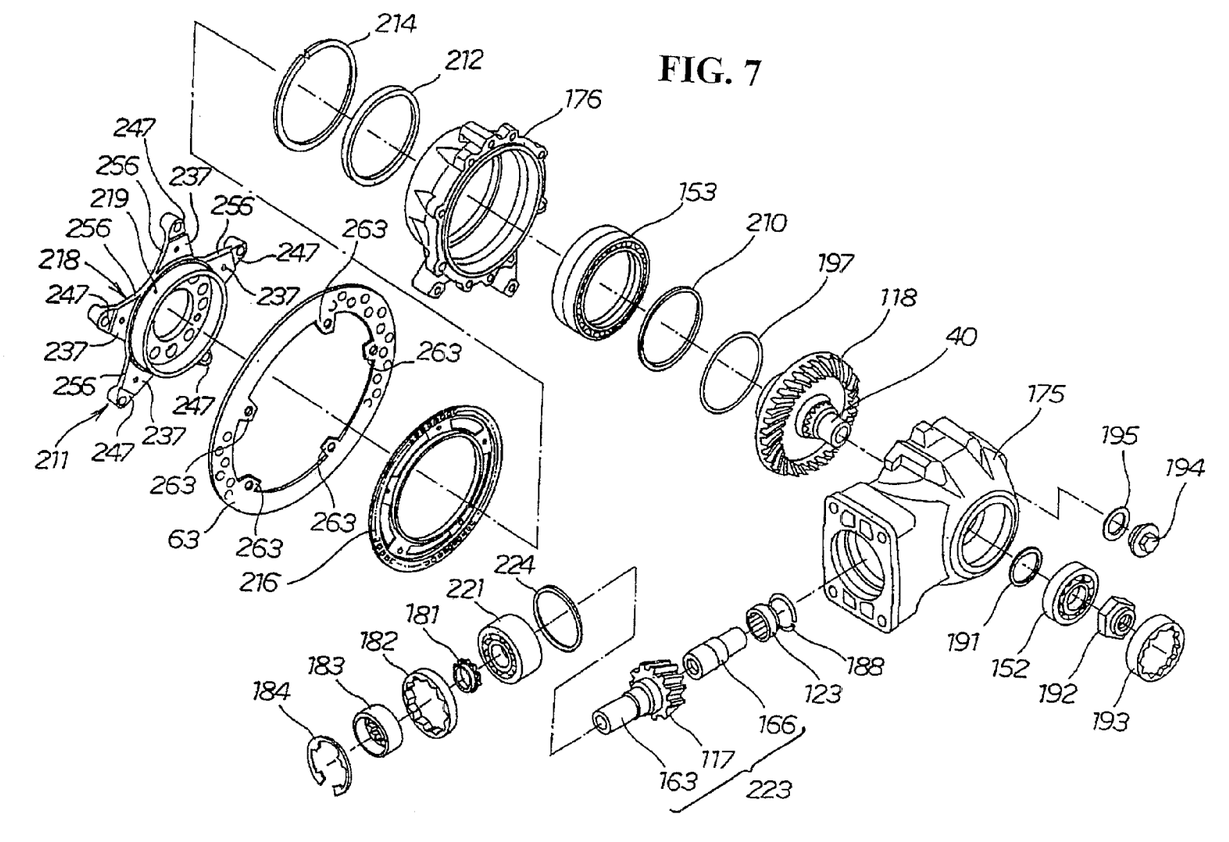
FIG. 7 is an exploded perspective view for illustrating a rear wheel axle according to the present invention and the surroundings of the same.

FIG. 7 is an exploded perspective view for illustrating the rear wheel according to the present invention and the surroundings of the same.

First, component members in the surroundings of the rear wheel will be described.

The rear wheel axle 40 with the final gear 118 fitted thereon is inserted into the gear case 175 from the right side, the second shim ring 191 is inserted from the left side of the gear case 175, the left bearing 152 is inserted, and the left bearing 152 is locked by a third lock nut 192 and a fourth lock nut 193.

The third shim ring 197 and the right bearing 153 are fitted onto the rear wheel axle 40 from the right side of the gear case 175, the gear case cover 176 is attached to the right bearing 153, the axle oil seal 212 and the retainer ring 214 are fitted in position from the outside of the gear case cover 176, and the presser flange 211 is attached thereto. In addition, the rear brake disc 63 and the pulser ring 216 are preliminarily attached to the presser flange 211.

The surroundings of the presser flange 211 will be described referring also to FIG. 5.

The presser flange 211 has the five arm parts 256 . . . , extending radially outwards from a hollow cylindrical part 219, the rear brake disc 63 is attached to the disc mounting parts 247 . . . provided at the tip parts of the five arm parts 256 . . . , the pulser ring 216 is attached to these arm parts 256 . . . and to ring mounting parts 237 . . . provided on the inner side of the disc mounting parts 247 . . . , and the hollow cylindrical part 219 of the presser flange 211 is fitted onto and mounted to the rear wheel axle 40.

A seal 210 is interposed between the rear wheel axle 40 and the presser flange 211.

Now, the configuration in the surroundings of the pinion gear will be described below.

The pinion shaft 166 with the circlip 185 and the O-ring 186 fitted thereon is inserted into an inner peripheral part (symbol 164 in FIG. 5) of the pinion gear 117. Thus, the bearing part 123 (needle bearing) in the state of being fitted with the stopper ring 188 is fitted into the gear case 175. Next, a pinion gear assembly 223 with the pinion shaft 166 inserted is inserted into the gear case 175 from the front side in the condition where a first shim ring 224 and the bearing part 121 are sequentially fitted in this order onto the outer periphery of the tubular part 163 extending from the pinion shaft 166, the bearing part 121 is held by the first lock nut 181 and the second lock nut 182. Thereafter, the first oil seal 183 is fitted in position, and a first retainer clip 184 is attached.

Figure 8:
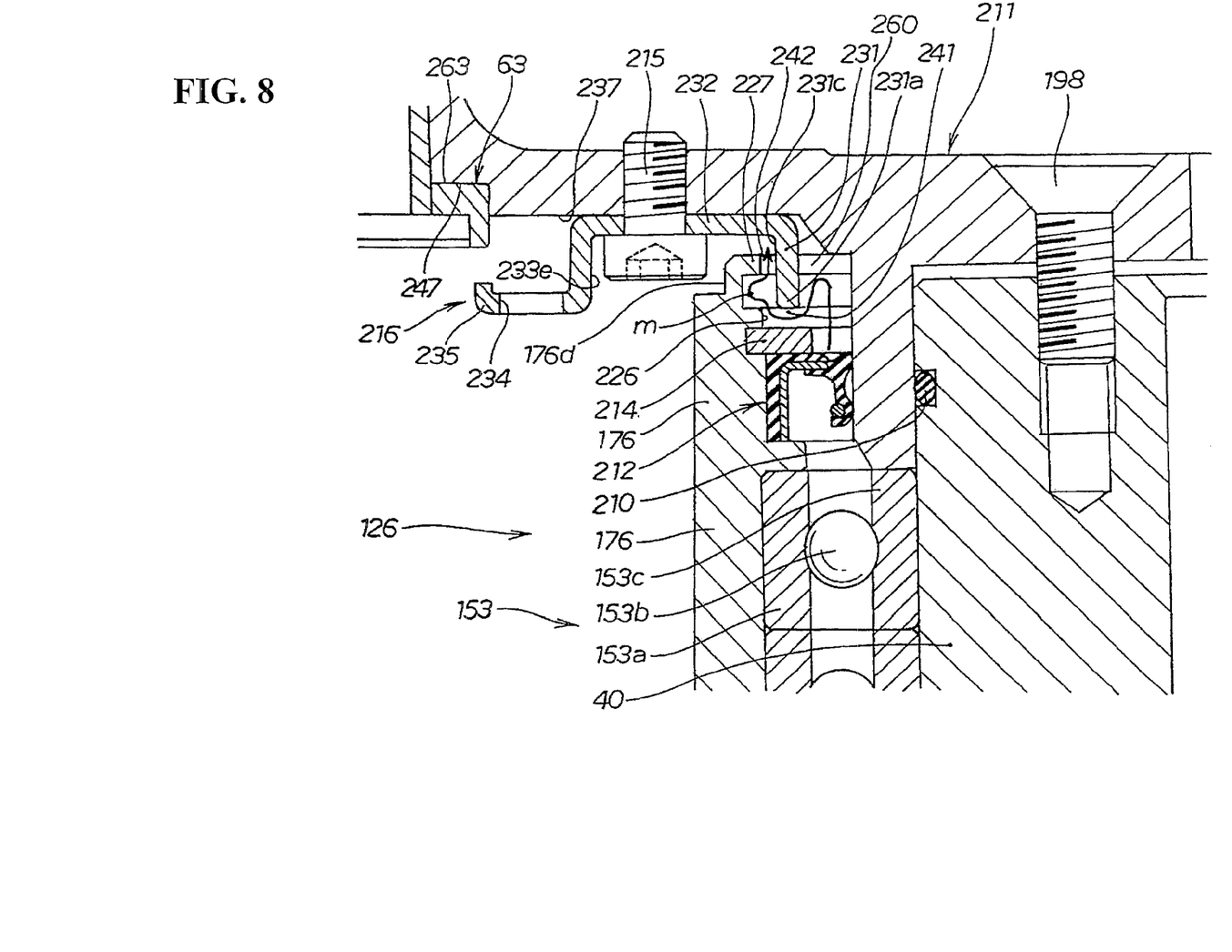
FIG. 8 illustrates a labyrinth structure provided in the gear box according to the present invention and operation of the same.

FIG. 8 illustrates a labyrinth structure provided in the gear box according to the present invention and the operation of the same.

The gear case cover 176 as a component member of the gear box 124 is provided with an opening 226 in its outer end part with an inside wall 227 extending toward the axis center of the rear wheel axle 40 is provided at the opening 226.

Since the inside wall 227 extending toward the center of the rear wheel axle 40 is provided at a rear wheel side end part of the opening part 226, a labyrinth can further be provided at a rear wheel side end part of the gear box 124. Therefore, leakage of oil through a gap between the gear box 124 and the rear wheel axle 40 can be further suppressed.

The pulser ring 216 playing the role of a component member of the labyrinth structure and serving as a member to be detected in measurement of wheel speed is a doughnut-shaped member. The pulser ring 216 includes, in the order from the inner side toward the outer side, an inner riser wall part 231 provided in parallel to the axial direction of the pulse ring 216 (in the axial direction of the rear wheel axle), a seat part 232 extends outwarding from the inner riser wall part 231 and perpendicularly to the axial direction of the pulser ring 216 and to which a bolt 215 is to be attached, an outer riser wall part 233 extending toward the vehicle inner side from the seat part 232 and in parallel to the axial direction of the pulser ring 216, and a detected part 235 extending outwards from the outer riser wall part 233 and perpendicularly to the axial direction of the pulser ring 216 and which is formed with a multiplicity of small holes 234 . . . for the detection of the wheel speed. The inner riser wall part 231 and the outer riser wall part 233 are disposed opposite to each other.

The pulser ring 216 is attached to a ring mounting part 237 provided at an inside surface of the presser flange 211, through bolts 215 . . . .

The labyrinth structure provided on the outer side of the axle oil seal 212 will be described below.

A first labyrinth passage 241 is formed between the retainer ring 214 for retaining the axle oil seal 212 and a tip part 231a of the inner riser wall part 231 provided as part of the pulser ring 216, and, on the outer side of the first labyrinth passage 241, a second labyrinth passage 242 is formed between the outside surface 231c of the inner riser wall part 231 and an inner wall 227 provided as part of the gear case cover 176.

More specifically, the inner riser wall part 231 as a labyrinth wall part extending in the vehicle width direction is integrally provided in the radial direction of the pulser ring 216 with the inner riser wall part 231 being disposed close to the retainer ring 214 and the inner wall 227, whereby the labyrinth structure is formed.

With the labyrinth structure thus provided, the route in the case of leakage of oil from the axle oil seal 212 is as indicated by arrow (m), so that oil leakage from the bearing 153 can be delayed.

The operation of the shaft drive type motorcycle as above-described will be described below.

Figure 9A:
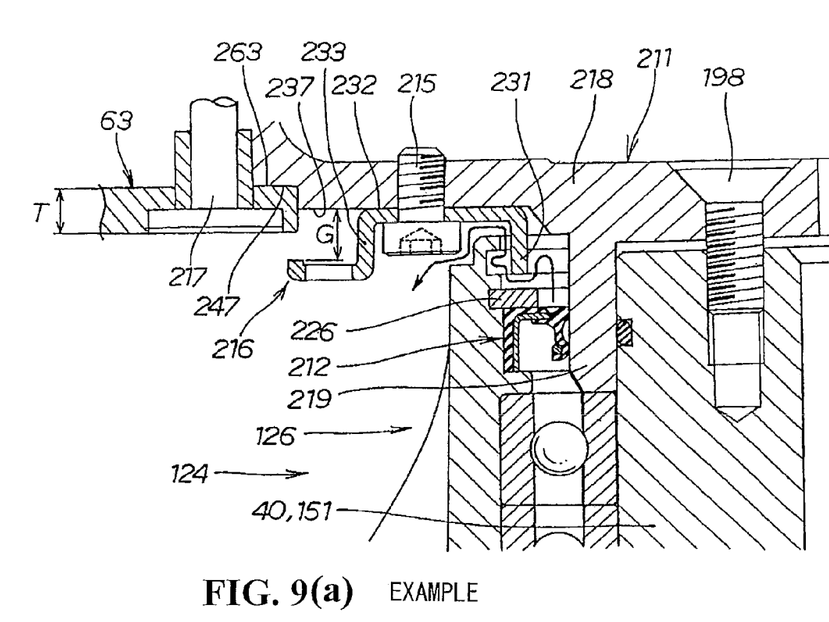
FIGS. 9(a) and 9(b) illustrate a mounting structure for a pulser ring according to the present invention and a Comparative Example.
Figure 9B:
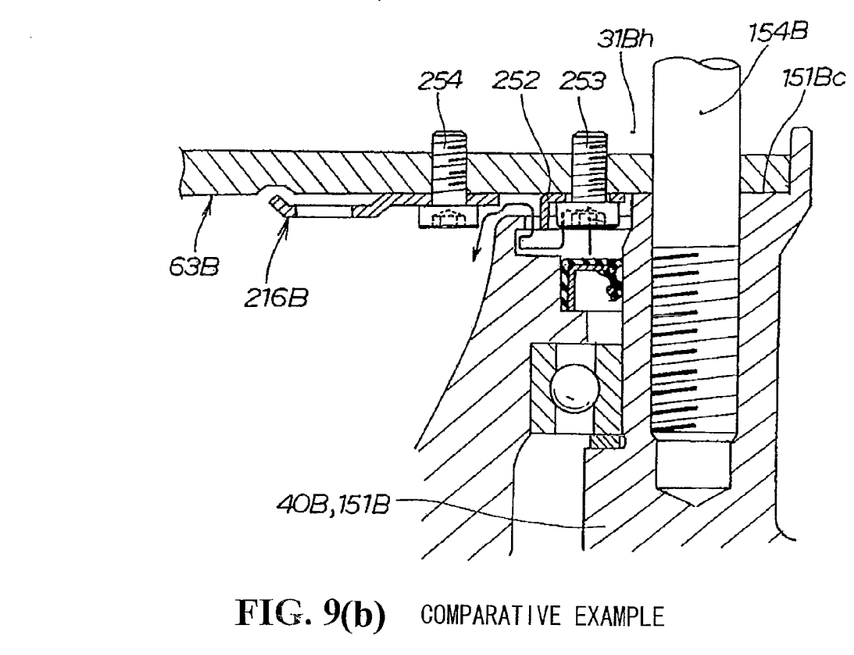

FIGS. 9(a) and 9(b) illustrate the mounting structure for the pulser ring according to the present invention and a comparative example. The inside of the gear box 124 is filled up with lubricating oil, the axle oil seal 212 is provided between the gear box 124 and the rear wheel axle 40, and the labyrinth structure for enhancing a sealing effect is provided on the outer side of the axle oil seal 212.

As illustrated in FIG. 9(a), an Example is shown. The presser flange 211 provided with the hollow cylindrical part 219, extending inwards in parallel to the axis of the rear wheel axle and with the flange part 218 extending outwards perpendicularly to the axis of the rear wheel axle, is fitted in the sleeve 151 provided as the rear wheel axle 40, and is attached to the sleeve 151 through the screw members 198. The seat part 232 of the pulser ring 216 is attached to the ring mounting part 237 serving as a component element of the flange part 218 through the bolt 215. The rear brake disc 63 is attached to the disc mounting parts 247 serving as component elements of the flange through the flat bolts 217.

The rear wheel axle 40 is provided with the pulser ring 216 for measurement of the wheel speed of the rear wheel 31, and the inner riser wall part 231 and the outer riser wall part 233 as labyrinth wall parts, extending in the vehicle width direction, are integrally provided on the radially inner side of the pulser ring 216.

As illustrated in FIG. 9(b), a Comparative Example is shown. A rear brake disc 63B is co-fastened to an outside surface 151Bc of a sleeve 151B serving as a rear wheel axle 40B by a fastening bolt 154B for fastening a rear wheel hub 31Bh. A labyrinth plate 252 is attached to the rear brake disc 63B through first bolts 253. A pulser ring 216B is attached on the outer side of the labyrinth plate 252 through second bolts 254.... In other words, for forming a labyrinth structure, an exclusive-use labyrinth plate 252 is mounted separately from the pulser ring 216B.

In such a structure, the labyrinth plate 252 as a labyrinth member and the first bolts 253 ... for attaching the labyrinth plate 252 and the like are needed as separate members, so that the number of component parts is increased, which may lead to a rise in the cost of the vehicle.

As illustrated in FIG. 9(a), the pulser ring 216 is integrally provided with the inner and outer riser wall parts 231 and 233 as labyrinth wall parts, so that it is possible to suppress an increase in the number of component parts and to reduce the cost of the vehicle.

Now, the operation of the presser flange will be described below.

Referring to FIGS. 5 to 7 also, the presser flange 211 is provided between the rear wheel axle 40 and the rear wheel 31. The presser flange 211 is provided with the flange part 218 for attaching the rear brake disc 63 serving as a brake disc, so that it is unnecessary to extend the rear brake disc 63 to the rear wheel axle 40.

Where the need to extend the rear brake disc 63 is eliminated, the rear brake disc 63 can be reduced in weight. In this case, since the presser flange 211 is provided with the plurality of arm parts 256 ... in an extending manner, an increase in weight due to the presser flange 211 can be suppressed, the amount of unnecessary material can be reduced and, as a whole, a reduction in the weight of the vehicle can be contrived. In addition, with the presser flange 211 being replaced by a member less expensive than the rear brake disc 63, the cost of the vehicle can be lowered.

In addition, the presser flange 211 has the hollow cylindrical part 219 for pressing the inner race 153c in the axial direction of the rear wheel axle 40. On the outer side of the right bearing 153, the rear wheel axle 40 is enlarged in the shaft diameter thereof due to the hollow cylindrical part 219 of the presser flange 211, so that rigidity of the rear wheel axle 40 can be easily secured.

Figure 10A:
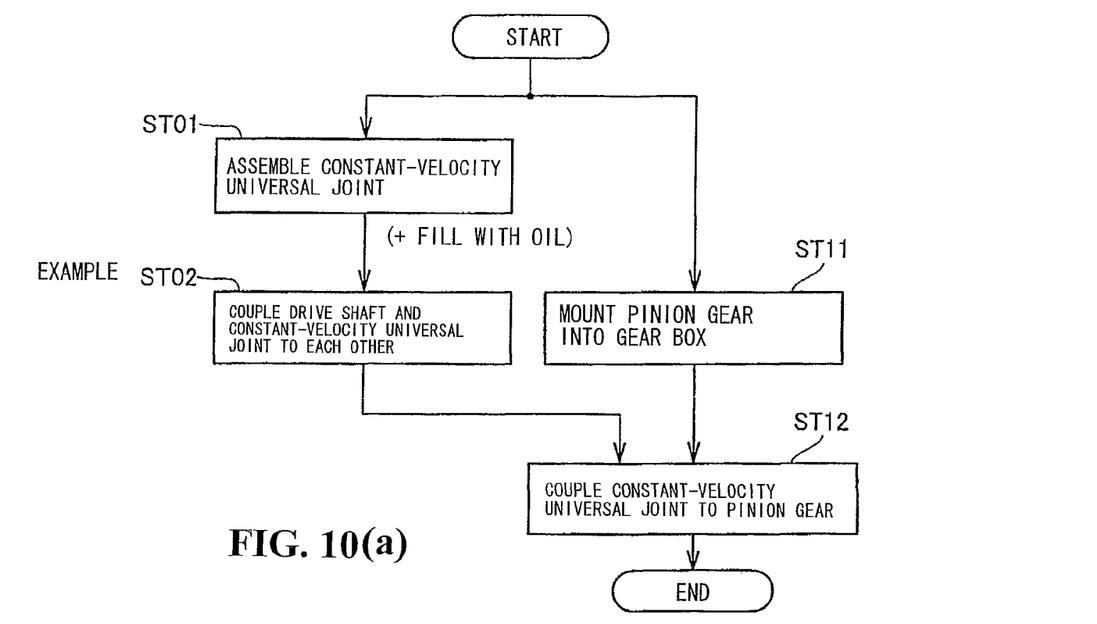
FIGS. 10(a) and 10(b) show flow charts for illustrating the procedure of assembling a drive shaft according to the present invention and a similar chart for a Comparative Example.
Figure 10B:
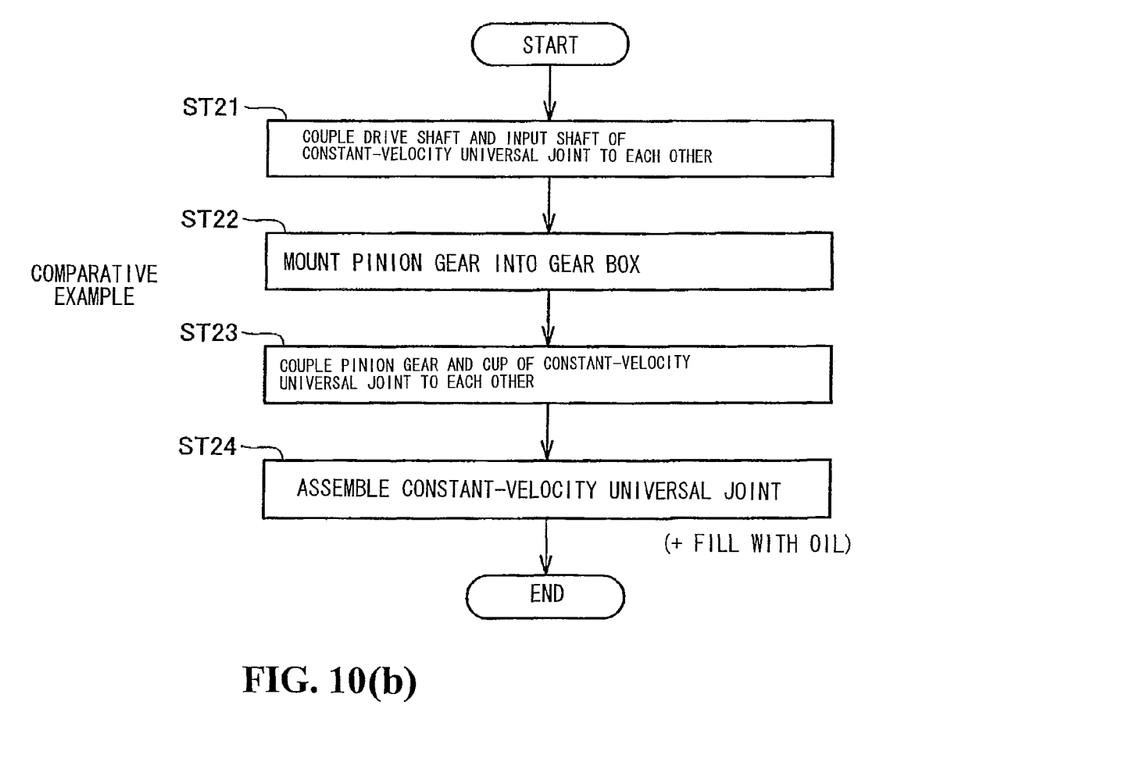

FIGS. 10(a) and 10(b) show flow charts for illustrating the procedure of assembling the drive shaft according to the present invention and a similar chart for a Comparative Example, which will be described based on FIGS. 4 to 7.

As illustrated in FIG. 10(a), an Example is shown. In step ST01, the constant-velocity universal joint 115 having the input shaft 156, the cup 157, the boot 158 and the like as component members is assembled with the cup 157 being filled with oil. In step ST02, the input shaft 156 of the constant-velocity universal joint 115 is coupled to the drive shaft 112 serving as a component member of the drive shaft 32. Steps ST01 and ST02 can be carried out on a sub-assembly line or the like, whereby workability in assembly of the constant-velocity universal joint 115 can be enhanced.

In step ST11, the pinion gear 117 is mounted into the gear box 124 on a main line or the like. In step ST12, the constant-velocity universal joint 115 is coupled to the pinion gear 117, thereby completing the work.

As illustrated in FIG. 10(b), a Comparative Example is shown. In step ST21, a drive shaft and an input shaft of a constant-velocity universal joint are coupled to each other on a main line or the like. In step ST22, a pinion gear is mounted into a gear box. In step ST23, the pinion gear and a cup of the constant-velocity universal joint are coupled to each other. In step ST24, the constant-velocity universal joint is assembled, and the cup is filled with oil, thereby completing the assembly work.

In a constant-velocity universal joint having such a structure, the sub-assembly of the constant-velocity universal joint prior to assembly of the drive shaft cannot be performed. Thus, the degree of freedom in assembling the drive shaft is limited. In addition, there is room for improvements from the viewpoint of enhancing the speed and efficiency of the assembly work. For instance, in the Comparative Example, the assembly of the constant-velocity universal joint is carried out on the main line in a narrow, limited space. This has been a problem in view of productivity.

At this point, according to the present invention, the shaft part 171 extends from the cup 157 of the constant-velocity universal joint 115, and the tubular part 163 of the pinion gear 117 is fitted to the shaft part 171. This ensures that the cup 157 of the constant-velocity universal joint 115 can be attached to the pinion gear 117 after sub-assembly of the constant-velocity universal joint 115. Therefore, it is possible to enhance the degree of freedom in the working procedure, and to contrive enhancement of the speed and efficiency of the work.

In addition, since the constant-velocity universal joint 115 being large in size and weight is disposed close to the bearing part 121 of the pinion gear 117, the generation of vibrations can be suppressed.

A description of the structure in which the rear brake disc 63 attached to the presser flange 211 according to the present invention is provided so that it can be attached and detached.

In FIG. 9(a), the size relationship of a gap G between the presser flange 211 and the pulser ring 216 with the plate thickness T of the rear brake disc 63 is set so that T<G.

Such a configuration ensures that when the flat bolts 217 . . . are removed, mounting seat parts 263 of the rear brake disc 63 can be detached from the vehicle body by a process in which the rear brake disc 63 is floated to the left wide in the vehicle width direction (to the lower side in the figure) from the disc mounting parts 247 . . . provided as part of the presser flange 211, and the rear brake disc 63 is turned in the direction of arrow in FIG. 6 to the imaginary-line position.

Referring to FIGS. 4 and 6 also, the procedure of detaching the rear brake disc will be described below. First, the fastening bolts 154 . . . are removed, the rear wheel 31 is detached to the right side in the vehicle width direction, and the rear disc brake caliper 62 is removed.

Next, the flat bolts 217 . . . are removed, the rear brake disc 63 is detached from the presser flange 211, floated from the disc mounting parts 247, and moved to the left side in the vehicle width direction. Finally, the rear brake disc 63 is staggered from the arm parts 256 . . . of the presser flange 211 in regard of phase, and the fastening parts of the rear brake disc 63 are turned to such a position that the fastening parts of the rear brake disc 63 and the arm parts 256 . . . of the presser flange 211 do not overlap with each other, whereby the rear brake disc 63 can be detached to the right side in the vehicle width direction.

In addition, while the present invention has been applied to a motorcycle in the above-described embodiment, the invention may be applied to general saddle ride type vehicles.

The present invention is preferable for application to a shaft drive type motorcycle which comprises a drive shaft, and a rear wheel axle driven by the drive shaft, and in which the rear wheel axle is equipped with a brake disc.

The present invention is preferable for application to a shaft drive type motorcycle which has an oil seal between a gear box and a rear wheel axle, and has a labyrinth structure on the outer side of the oil seal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shaft drive type motorcycle comprising:
a body frame;
a swing arm provided on said body frame and operative to swingably support a rear wheel;
a drive shaft provided in said swing arm or adjacently to said swing arm for supplying a driving force of an engine to be transmitted to a rear wheel axle operatively connected to said rear wheel;
a pinion gear provided at one end of said drive shaft and meshed with a final gear provided on said rear wheel axle;
a gear box provided at a rear part of said swing arm and accommodating said final gear; and
a bearing provided between said gear box and said rear wheel axle, said bearing including an outer race and balls and an inner race, and said bearing is operative to rotatably support said rear wheel axle;
wherein a presser flange includes a hollow cylindrical part, said hollow cylindrical part engages the inner race to press the inner race in an axial direction of said rear wheel axle, said presser flange being provided between said rear wheel axle and said rear wheel; and
said presser flange is provided with a flange part in a radial direction of said rear wheel axle and to which a brake disc is mounted.

2. The shaft drive type motorcycle according to claim 1, wherein said flange part includes a plurality of arm parts extending in the radial direction of said rear wheel axle, and said brake disc is mounted to tip parts of said arm parts.

3. The shaft drive type motorcycle according to claim 2, wherein said swing arm is configured in a cantilever fashion in which said rear wheel is supported only from the gear box side;
said brake disc is provided at its inside diameter part with a plurality of mounting seat parts extending toward the radially inner side and which are mounted to the rear wheel side; and
said mounting seat parts are mounted to said tip parts of said arm parts.

4. The shaft drive type motorcycle according to claim 1, wherein a pulser ring for measurement of wheel speed is mounted on a radially inner side relative to disc mounting parts which are provided as part of said flange part and to which said brake disc is mounted; and
said pulser ring is provided with an outer riser wall part such that a gap between said presser flange and an outside diameter of said pulser ring is greater than a plate thickness of said brake disc.

5. The shaft drive type motorcycle according to claim 2, wherein a pulser ring for measurement of wheel speed is mounted on a radially inner side relative to disc mounting parts which are provided as part of said flange part and to which said brake disc is mounted; and
said pulser ring is provided with an outer riser wall part such that a gap between said presser flange and an outside diameter of said pulser ring is greater than a plate thickness of said brake disc.

6. The shaft drive type motorcycle according to claim 1, wherein the presser flange includes the hollow cylindrical part extending inwards substantially in parallel to an axis of the rear wheel axle with the flange part extending outwardly substantially perpendicularly to the axis of the rear wheel axle and is fitted and secured within a sleeve.

7. The shaft drive type motorcycle according to claim 1, and further including a pulser ring for measurement of the rear wheel speed is mounted to said presser flange at a first predetermined distance from the rear wheel axle and said brake disc is mounted to said presser flange at a second predetermined distance from the rear wheel axle, said second predetermined distance being greater than said first predetermined distance.

8. The shaft drive type motorcycle according to claim 1, and further including a pulser ring operatively mounted relative to said presser flange, said pulser ring including an inner and outer riser wall portions forming a labyrinth wall portion for reducing the number of component parts.

9. A shaft drive type motorcycle comprising:
a drive shaft for transmitting a driving force of an engine to a rear wheel axle operatively connected to a rear wheel;
a bearing provided between a gear box and the rear wheel axle, said bearing being operatively provided for rotatably supporting said rear wheel axle;
a presser flange having a hollow cylindrical part, said hollow cylindrical part engages an inner race to press the inner race in an axial direction of said rear wheel axle, said presser flange being provided between said rear wheel axle and the rear wheel; and a flange formed and extending from said presser flange, said flange being provided with a flange part in a radial direction of said rear wheel axle and to which a brake disc is mounted.

10. The shaft drive type motorcycle according to claim 9, wherein said flange part includes a plurality of arm parts extending in the radial direction of said rear wheel axle, and said brake disc is mounted to tip parts of said arm parts.

11. The shaft drive type motorcycle according to claim 10, wherein said brake disc includes a plurality of mounting seat parts extending toward the radially inner side at an inside diameter portion and which are mounted to a rear wheel side; and said mounting seat parts are mounted to said tip parts of said arm parts.

12. The shaft drive type motorcycle according to claim 9, wherein a pulser ring for measurement of wheel speed is mounted on a radially inner side relative to disc mounting parts which are provided as part of said flange part and to which said brake disc is mounted; and said pulser ring is provided with an outer riser wall part such that a gap between said presser flange and an outside diameter of said pulser ring is greater than a plate thickness of said brake disc.

13. The shaft drive type motorcycle according to claim 10, wherein a pulser ring for measurement of wheel speed is mounted on a radially inner side relative to disc mounting parts which are provided as part of said flange part and to which said brake disc is mounted; and said pulser ring is provided with an outer riser wall part such that a gap between said presser flange and an outside diameter of said pulser ring is greater than a plate thickness of said brake disc.

14. The shaft drive type motorcycle according to claim 9, wherein the presser flange includes the hollow cylindrical part extending inwards substantially in parallel to an axis of the rear wheel axle with the flange part extending outwardly substantially perpendicularly to the axis of the rear wheel axle and is fitted and secured within a sleeve.

15. The shaft drive type motorcycle according to claim 9, and further including a pulser ring for measurement of the rear wheel speed is mounted to said presser flange at a first predetermined distance from the rear wheel axle and said brake disc is mounted to said presser flange at a second predetermined distance from the rear wheel axle, said second predetermined distance being greater than said first predetermined distance.

16. The shaft drive type motorcycle according to claim 9, and further including a pulser ring operatively mounted relative to said presser flange, said pulser ring including an inner and outer riser wall portions forming a labyrinth wall portion for reducing the number of component parts.

17. A shaft drive type motorcycle comprising:

a body frame;

a swing arm provided on said body frame and operative to swingably support a rear wheel;

a drive shaft provided in said swing arm or adjacently to said swing arm and by which a driving force of an engine is transmitted to a rear wheel axle provided in said rear wheel;

a pinion gear provided at one end of said drive shaft and meshed with a final gear provided on said rear wheel axle;

a gear box provided at a rear part of said swing arm and accommodating said final gear;

wherein said gear box is provided with an opening part through which to pass said rear wheel axle;

said rear wheel axle is equipped with a pulser ring for measurement of wheel speed of said rear wheel; and a labyrinth wall part extending to an inner side of said opening part in the vehicle width direction is integrally provided on a radially inner side of said pulser ring.

18. The shaft drive type motorcycle according to claim 17, wherein an inside wall extending toward the center of said rear wheel axle is provided at an end part on the rear wheel side of said opening part.

19. The shaft drive type motorcycle according to claim 17, wherein a bearing is provided between said rear wheel axle and said opening part, a presser flange includes a hollow cylindrical part, said hollow cylindrical part engages an inner race of said bearing in an axial direction of said rear wheel axle and said rear wheel, a brake disc is mounted to said presser flange part, and said pulser ring is mounted on the inner side of said brake disc.

20. The shaft drive type motorcycle according to claim 18, wherein a bearing is provided between said rear wheel axle and said opening part, a presser flange includes a hollow cylindrical part, said hollow cylindrical part engages an inner race of said bearing in an axial direction of said rear wheel axle and said rear wheel, a brake disc is mounted to said presser flange part, and said pulser ring is mounted on the inner side of said brake disc.

* * * * *